United States Patent Office 3,152,798
Patented Oct. 13, 1964

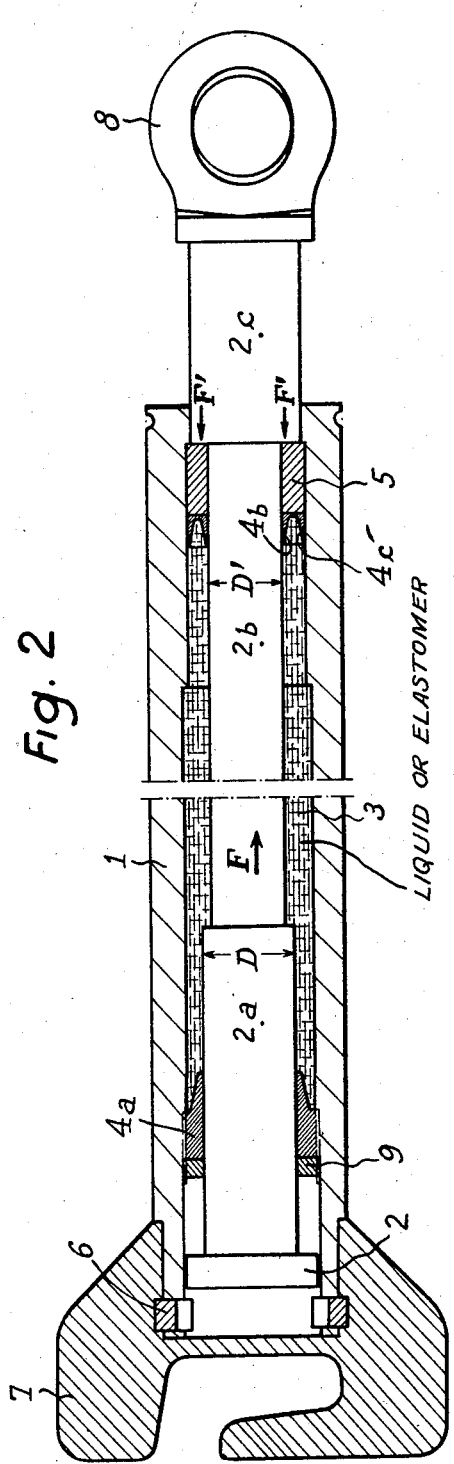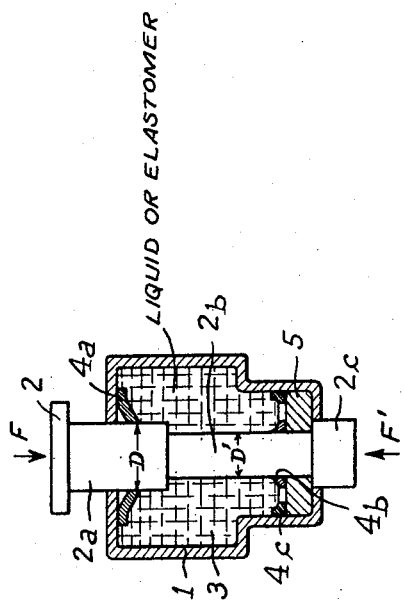

3,152,798
HYDROSTATIC SHOCK ABSORBER SPRINGS
Jean Jarret, Fourqueux, and Jacques Jarret, Le Vesinet, France, assignors to Societe d'Exploitation des Ressorts Autoamortisseurs Jarret, Paris, France, a company of France
Filed July 31, 1962, Ser. No. 213,655
Claims priority, application France Aug. 7, 1961
4 Claims. (Cl. 267—1)

Shock absorber springs are known formed by a rigid casing, entirely filled with an elastomer, which receives a piston able to vary the volume of this elastomer, sealing between the piston and the casing having to be perfect to prevent an elastomer film forming between the sliding parts and causing them to jam. The applicants' United Kingdom Letters Patent No. 871,847 and United States Patent No. 2,994,524 shows a seal which is satisfactory for this.

However the variations in volume of the elastomer are relatively small (less than 20% and more usually less than 10%); when it is wished that the piston stroke shall be large to obtain normal pressure, one is lead to adopt a small diameter piston with the risk of buckling, that is to say deformation by flexing if the component of the exterior forces is not exactly along the axes of the piston.

To overcome this, it has been proposed to adopt elastic systems in which a differential piston slides to the two opposite extremes of the casing filled with elastomer, the large section part entering the casing as the small section part leaves. The variation of volume is then obtained, on movement of the piston, only by virtue of the difference of the sections, each of which can be in absolute value very much larger than the section of the simple piston, for the same ratio of stroke to pressure.

According to the invention, such a differential piston, which extends from end to end of the casing filled with elastomer, is provided with a sliding ring which is held by the casing and remains stationary during an operative stroke, but which is entrained by the piston by means of a collar when the piston tends to be withdrawn from the casing.

If the sliding ring has a cross sectional are a greater than the difference of the cross sectional areas of the piston, the volume of the elastomer will then be reduced by simultaneous displacement of the piston and the ring, and the spring will function in inverse sense to its usual function. The same casing, containing a like quantity of elastomer, will thus serve as a compression spring and a tension spring, depending upon whether the sliding ring is entrained or not by the piston, and according to the direction of the forces applied to the piston.

Such an arrangement is applicable particularly for automatic tow bars of towed vehicles, because the tow bars are subject to large alternate loads. The elastomer hydrostatic compression shock absorber spring is then preferably placed between the head of the tow bar and the articulation which allows angular displacement of this head.

The attached drawing allows a better understanding of the invention.

FIGURE 1 is a schematic cross section showing the principle of the invention;

FIGURE 2 is a section of an embodiment of the invention applied to an automatic tow-bar for towed vehicles.

The device shown in FIGURE 1 comprises in known manner a rigid cylindrical casing 1, in which slides a differential piston 2 of which the larger diameter 2a penetrates one extremity of the cylinder and of which the smaller diameter part 2b leaves by way of the other extremity of the cylinder. The interior free space of the casing is entirely filled with elastomer or slightly compressible liquid 3 confined by a sealing arrangement such as that for example described in the applicants' patents above referred to, provided at both extremities and substantially indicated at 4a and 4b. Whatever the absolute values of the cross sectional areas D and D' of the two piston elements 2a and 2b, this arrangement of the device results in the stroke of piston 2 under the effect of the force F applied to it, being proportional to the value of the difference of the cross sectional area D–D'.

According to the invention, this device shown is arranged so as to serve as a compression spring in the direction of force F and a tension spring in the opposite sense F'. To this end a ring 5 is provided normally resting against the base of casing 1 and against a shoulder 2c on the piston.

The piston can thus slide freely relative to the ring 5. When the piston moves under the action of the force F, the ring then resting on the lower wall of the casing, plays no part.

If on the other hand the piston is subjected to a force in the direction F', the ring 5 tends to play the part of a piston relative to the casing 1 and there is therefore provided a third joint 4c. If ring 5 has an a cross sectional area larger than the difference of the cross sectional area D and D' of the two parts of the piston, the displacement of this piston and thus of the ring will tend to compress the elastomer and the spring will function in a sense inverse to its usual.

The device will therefore function alternatively as a compression spring and a tension spring.

FIGURE 2 shows an application of the device which has just been described as an automatic coupling for a towed vehicle subject to alternate forces.

In the drawing has been shown the body of the tow bar forming the casing 1 of the preceding figure, made fast with a coupling head 7 of known construction by a key 6.

On the inside of the casing or cylinder 1, moves the piston formed by two parts 2a and 2b of diameters D and D' respectively and transmitting by its part 2a, the compressive load in the direction F.

At the other extremity, there is located on the part 2b of the piston a ring 5 freely sliding in one sense on this piston and bearing in the other sense against the cylinder 1 and the part of greatest diameter 2c of the piston being fast with an articulated joint member 8 of the other vehicle. It is this ring which transmits to the elastomer the compressive load in the direction F'. It will be seen that, as in FIGURE 1, the cross sectional area of the ring 5 is here greater than D–D'.

The seals 4a, 4b, 4c shown in FIGURE 1 schematically, are here formed by lips 4a coupled with a ring 9 fast with cylinder 1 and two lips 4b, 4c coupled with the ring 5 and cooperating respectively on one side with the piston 2b, and on the other side with the casing 1.

It will be seen in this application that the load in the direction F corresponds to the tractive load applied to the piston 2a, 2b, 2c by the coupled vehicles at 7 and 8 and which tend to draw away from one another. The load F' on the other hand is transmitted to the ring 5 by the forces due to relative approach of the two vehicles.

The head 2 of the piston serves here only ultimately to limit the relative stroke of the piston and cylinder.

Nevertheless, the invention is not limited to the application which has just been described. It is not limited either to the seal arrangement which has been described in the applicants' patents referred to above.

Finally the device according to the invention for transforming the compression spring into a spring which functions in both senses, could be applied to a spring in which the elastomer is replaced by a slightly compressible liquid.

What we claim is:

1. In a shock absorber spring assembly, the combination comprising a rigid casing having apertured end walls and a connecting wall therebetween, said connecting wall having parts of different dimensions defining different cross sectional areas, elastomer means disposed in said casing, a piston element reciprocably extending through said casing and having different cross sectional dimensions to define a differential piston with a differential piston area for varying the volume of the elastomer means during sliding movement therethrough, sealing means for said piston element in said casing, shoulder means on the smaller cross sectional dimension of said differential piston adapted to reciprocate through one apertured end wall, and a ring element slidably disposed on said differential piston and being engageable with said shoulder means and said one apertured end wall, said ring element being retained by said apertured end wall during movement of said differential piston in one direction, said ring element being retained by said shoulder means during movement of said differential piston in an opposite direction whereby said ring element is moved with said differential piston to present an additional piston area acting on said elastomer means.

2. The invention recited in claim 1, wherein said sealing means includes a seal element engaging the smaller cross sectional dimension of said differential piston and the smaller part of said connecting wall, and said seal element being disposed adjacent said ring element for movement therewith.

3. The invention as recited in claim 2, wherein the piston area of said ring element is greater than the differential piston area of said differential piston.

4. The invention as recited in claim 3, wherein one end of said casing carries a coupling head and an end of said piston element protruding through an opposite end of said casing carries an articulated joint member whereby the spring assembly forms a tow coupling between a pair of vehicles.

References Cited in the file of this patent

UNITED STATES PATENTS

| | | |
|---|---|---|
| 2,994,524 | Jarret et al. | Aug. 1, 1961 |
| 3,012,770 | Kendall | Dec. 12, 1961 |